Feb. 21, 1961  F. R. KIMBROUGH  2,972,438
FISH STRINGER
Filed Jan. 8, 1957
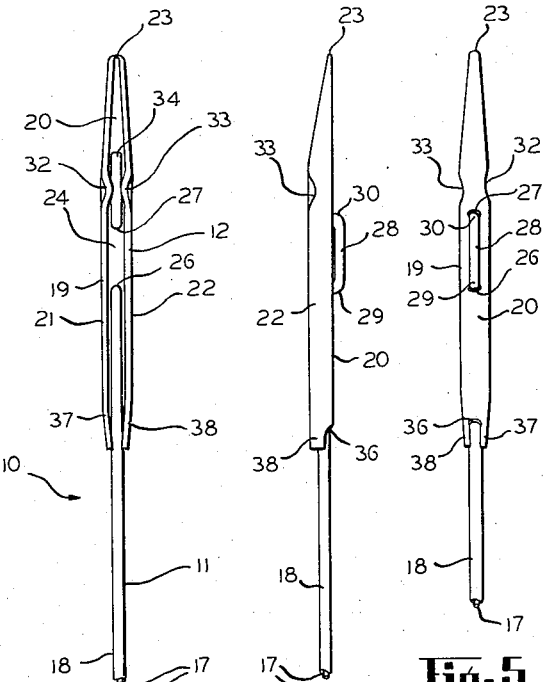
INVENTOR.
FRANK R. KIMBROUGH
BY
ATTORNEYS

United States Patent Office 2,972,438
Patented Feb. 21, 1961

2,972,438

FISH STRINGER

Frank R. Kimbrough, 2001 E. Franklin St., Richmond, Va.

Filed Jan. 8, 1957, Ser. No. 632,989

4 Claims. (Cl. 224—7)

This invention relates generally to fishing equipment and more particularly to a fish stringer having a flexible fluid-impervious external surface and further characterized by improved needle and ring means on opposite ends of the line.

Most contemporary fish stringers are made by coupling a metal needle on one end of a piece of cotton or other fibrous cord. Since the cord is water-absorptive, it swells upon getting wet and displays unfavorable tendencies of accumulating dirt, fish gills and other foreign objects and impurities. Moreover, such cords are not readily sanitized because they are difficult to wash.

According to the principles of the present invention, there is provided a fish stringer which comprises either a cord-like member having an elongated core made of a mat of fibers or a bundle of fibrous material encased in a sheath of flexible fluid-impervious material such as a moisture-resistant fluid-impervious natural or synthetic resin or a cord made entirely of a plastic material. Since the peripheral surface of such a cord of the present invention is non-absorptive, the stringer is easily washed and cleaned.

It is further contemplated according to the principles of the present invention to provide an improved needle construction which facilitates attachment of the needle to the improved cord of the present invention without deleteriously affecting the plastic surface cord. Thus, there is provided a needle comprising a sheet form member shaped to provide an elongated U-shaped body with a bight portion and spaced parallel legs. One end of the stringer line is nested between the legs on one side of the bight portion but intermediate the ends of the needle, a portion of the stringer is passed through the bight portion of the needle and disposed on the opposite surface thereof, thereby forming a definite locking means for resisting relative axial displacement of the needle and the stringer.

Most contemporary fish stringers are made with a ring attached through a loop at the end of the cord opposite the needle. When fish are caught, the first fish is threaded onto the stringer by passing the needle of the stringer through the mouth of the fish and the gills of the fish whereupon a loop is formed by passing the needle through the closed ring. In this manner, the first fish is locked permanently or securely on the bottom end of the stringer and other fish are added on the stringer by passing the needle through the gills and mouth of the fish. When it is desired to remove the fish from such a line, they must be lifted one by one and the needle must be reversely pulled through the fish's mouth. That is a particularly awkward job which is completely avoided in accordance with the principles of the present invention.

On the stringer of the present invention there is provided a split ring. The stringing of the first fish follows the usual procedure, but when it is desired to remove the fish from the stringer, the split ring is merely detached or separated to release and break the loop through the mouth and gills of the first fish, whereupon the entire stringer of fish will readily and with great facility slide off of the ring end of the stringer line.

It is an object of the present invention, therefore, to provide an improved fish stringer which overcomes the deficiencies of fish stringers heretofore available.

Another object of the present invention is to provide a fish stringer having improved sanitary characteristics.

Another object of the present invention is to provide a fish stringer with a fluid-impervious surface which can be readily washed.

Another object of the present invention is to provide a fish stringer which utilizes a cord-like member having an elongated fibrous core and encased in a flexible fluid-impervious sheath.

Another object of the present invention is to provide an improved needle for a plastic-coated or solid plastic fish stringer.

A still further object of the present invention is to provide an improved ring construction for a fish stringer.

Many other features, advantages and additional objects of the present invention will become manifest to those versed in the art upon making reference to the detailed description which follows and the accompanying sheet of drawings in which a preferred structural embodiment of the principles of the present invention is shown by way of illustrative example.

On the drawings:

Figure 1 is a perspective view of the bottom end of the fish stringer provided in accordance with the principles of the present invention illustrating the particular utility of the split ring arrangement disclosed herein;

Figure 2 is a view similar to Figure 1 illustrating the use of the present invention;

Figure 3 is an elevational view of the fish stringer of the present invention and shows details of construction of the needle provided for the fish stringer;

Figure 4 is a side elevational view of the fish stringer of Figure 3;

Figure 5 is an elevational view showing the side of the needle opposite that shown in Figure 3; and Figure 6 is an elevational view of an alternative form of loop member for the stringer of this invention.

As shown on the drawings:

The fish stringer of the present invention is indicated generally at 10 and the component portions thereof include a stringer 11 which will sometimes be referred to herein as a cord or a cord-like member or perhaps as a stringer line. At one end of the stringer 11 there is provided a needle 12. At the opposite end of the stringer 11, a portion of the stringer is bent back upon itself to form a loop 13 which is securely locked in place by a ferrule 14 crimped over the free end of the stringer 11 and an adjoining portion of the stringer 11 intermediate the ends thereof. A ring 16 is connected to the loop 13. Alternatively, a metal terminal ring 13a having a ferrule portion 13b is crimped on the end of the cord and has an aperture 13c formed to receive the ring 16 (Figure 6).

Referring now more specifically to the characteristics of the stringer 11, it will be noted that the stringer 11 comprises a cord having a moisture-impervious surface. For example, an elongated core is indicated in the drawings at 17. The core is made of any suitable fibrous material and in accordance with the principles of the present invention, it may be noted that it is not specifically necessary that the core 17 comprise woven fibers. It is specifically contemplated that the core 17 can comprise a mat of fibers or a bundle of loose fibers and it is entirely possible that the core 17 may take the form of paper fibers or the like. The core 17 is encased within a flexible cylindrical sheath 18 preferably made of a fluid-impervious material.

Alternatively, the entire cord may be made of plastic material as shown in Figure 6 at 11a. A suitable fluid-impervious material for either the sheath 18 or cord 11a would consitute a natural or synthetic resin which is moisture-resistant or fluid-impervious. Examples of suitable materials include polystyrene or polyethylene as well as the vinyl polymers and copolymers or synthetic rubber.

By virtue of the provision of the moisture-impervious surface of the sheath 18 or cord 11a, there is formed on the stringer 11 a fluid-impervious peripheral surface which is non-absorptive and which can be easily washed or cleaned.

The needle 12 takes the form of an elongated sheet form member having a body 19 including a bight portion 20 and spaced generally parallel legs 21 and 22.

At one end of the body 19, there is formed a reduced area portion forming a point 23 for the needle 12.

The size of the stringer 11 and the dimensions of the needle 12 are preferably selected so that the spacing dimension between the oppositely disposed legs 21 and 22 of the needle 12 is approximately the same as the thickness of the stringer 11. Thus, the stringer 11 abuts against one side of the body 19 for an appreciable length longitudinally inwardly of one end of the stringer and as shown in the drawings, the end of the stringer 11 is actually nested between the legs 21 and 22 against one side of the bight portion 20.

The type of crimped joint which might be used between a cotton stringer and a conventional needle is apt to result in destructive injury of the plastic coated line. Accordingly, in accordance with the principles of the present invention, an intermediate portion of the body 19 is provided in the bight portion 20 to underlie a transversely looped portion of the stringer 11, thereby to resist relative longitudinal displacement of the needle 12 and the stringer 11. The locking portion so provided is clearly indicated at 24.

More specifically, and as exemplified by the disclosure herein, the bight portion 20 is provided with a pair of longitudinally spaced apertures 26 and 27. The stringer 11 is led between the legs 21 and 22 and is then inserted through the aperture 26 to the opposite side of the bight portion 20 so that the transversely looped portion indicated at 28 lies against the outside surface of the bight portion 20. The stringer 11 is then inserted through the aperture 27 and extends further between the legs 21 and 22 towards the point 23.

The sharp turns indicated at 29 and 30 in the stringer 11 abut against the edges of the apertures 26 and 27 and firmly resist relative longitudinal displacement between the needle 12 and the stringer 11 without deleteriously affecting the plastic or plastic coated cord forming the stringer 11. Thus, the cord is connected to the needle without damaging or breaking the cord.

Longitudinally outwardly of the aperture 27, the leg 21 is provided with a crimp 32 and the leg 22 is provided with a crimp 33. The crimped portions 32 and 33 are oppositely disposed with respect to one another and extend relatively inwardly to closely confine the free end of the stringer 11, which free end, for the sake of clarity, is indicated by a separate reference numeral 34.

At the end of the needle 12 opposite the point 23, the bight portion 20 is provided with a slotted recess 36 and the legs 21 and 22 are slightly crimped as at 37 and 38, respectively, thereby tending to confine the stringer 11 in properly nested relationship between the legs 21 and 22 without placing undue stress on the plastic coated cord.

As is clearly shown in the drawings, the ring 16 constitutes a split ring which includes a body 40 extending through a full 360° and including an offset indicated at 41 to accommodate a first arm 42 on one side of the body 40 and a second arm 43 on the other side of the body. The respective arms 42 and 43 also extend through a total of 360° of arc so that the split ring 16 will operate as a closed ring when the needle is passed therethrough in stringing the first fish on the stringer 11.

The use of the ring is depicted in Figures 1, 2 and 3. Thus, as shown in Figure 3, the needle 12 has been passed through the ring 16 and as shown in Figure 1, the first fish on the stringer indicated at A is locked securely on the bottom end of the stringer 11, a loop 50 being formed through the gills and the mouth of the fish A.

Fish are added on the stringer in the usual manner such as the fish indicated at B. When it is desired to remove fish from the stringer 10, instead of lifting the fish up one by one and awkwardly pulling the needle reversely through the gills in the fish's mouth, the split ring 16 is worked around the loop 13 of the stringer 11, as shown in Figure 2, wherein the cord 11 is being passed between the leg 43 and the body 41, or the terminal ring 13a of Figure 6. Thus, the split ring 16 becomes detached or separated from the loop 13 or the terminal ring 13a and breaks the loop 50.

The entire string of fish will then readily and with great facility slide off of the end of the stringer 10 over the loop 13 or over the terminal ring 13a. The ring 16 can again be attached to the loop 13 or the metal terminal ring 13a after the fish are removed from the stringer 11.

Although various minor modifications might be suggested by those versed in the art, it should be understood that I wish to embody within the scope of the patent warranted hereon all such modifications as reasonably and properly come within the scope of my contribution to the art.

I claim as my invention:

1. In a fish stringer of the type using a stringer line made of a sheathed fibrous core, the improvement of a needle comprising an elongated sheet form member having a trough-shaped body including a bight portion with oppositely disposed surfaces and further including spaced generally parallel legs, said body having a reduced area portion at one end thereof forming a point for said needle, and a stringer line disposed against one of said surfaces on said bight portion and extending longitudinally between said spaced generally parallel legs, said trough-shaped body having means formed therein providing a pair of openings spaced longitudinally inwardly from said one end of said body through which a portion of said stringer line inwardly of one end is passed for disposition on the other of said surfaces of said bight portion of said body and including a longitudinally extending portion of said body underlying said stringer line at said other of said surfaces, and said body being crimped against said one end of said line longitudinally outwardly of said openings to lock said needle to said line.

2. In a fish stringer, a cord comprising a cord-like member having an elongated core made of fibrous material and a peripheral sheath made of a flexible fluid impervious material, a needle attached to one end of said cord comprising a sheet-form member bent into a generally U-shaped configuration with parallel legs spaced approximately the width of said cord-like member, said needle having a bight portion formed with a pair of axially spaced apertures intermediate the ends thereof, said cord-like member being disposed to lie between said legs on one side of said bight portion and having a portion thereof threaded through said two apertures and disposed to lie on the opposite side of said bight portion between said apertures, thereby to lock said needle in assembly with said cord-like member and rigidifying said one end of said cord, and a separable split ring detachably connected to the other end of said cord and forming a circumferentially continuous split loop, said ring being of a size sufficiently small to pass through the mouth and gills of the fish threaded on said cord, said needle and said cord adapted to be inserted through the mouth and gills of a first fish, said needle and cord being insertable through said circumferentially continuous loop provided by said ring for forming together with said cord a loop lock adapted to engage said first fish in locked relation on the end of the stringer, whereupon successive fish may be retained on said cord, said split ring having separable portions facilitating detachment of said stringer therethrough for selectively breaking said loop lock, whereupon fish strung on the stringer with the cord passed through their mouth and gills from the needle end of the stringer can be removed from the opposite end of the stringer over said ring by passing said ring through the mouth and gills of the successive fish on the stringer.

3. A fish stringer as defined in claim 2, said other end of said cord being bent back upon itself and forming a loop connected to said split ring, and a metal ferrule locking the bent end of said cord to keep said loop closed.

4. A fish stringer as defined in claim 2, and a metal terminal ring having a recessed ferrule portion receiving the free end at said other end of said cord and being crimp fastened on said other end of said cord and having an apertured portion formed therein for receiving said split ring in detachable assembly therewith.

References Cited in the file of this patent

UNITED STATES PATENTS

| | | |
|---|---|---|
| 1,295,669 | Addison | Feb. 25, 1919 |
| 1,465,754 | Berolzheimer | Aug. 21, 1923 |
| 1,674,045 | James | June 19, 1928 |
| 1,975,754 | Pflueger | Oct. 2, 1934 |
| 2,047,834 | Plasters | July 14, 1936 |
| 2,062,386 | Whithey | Dec. 1, 1936 |
| 2,081,209 | Wilhelm et al. | May 25, 1937 |
| 2,215,760 | Ledrich | Sept. 24, 1940 |
| 2,316,511 | Flournoy | Apr. 13, 1943 |
| 2,477,201 | Points | July 26, 1949 |
| 2,588,768 | Rosenberg | Mar. 11, 1952 |
| 2,599,057 | Jarabek | June 3, 1952 |
| 2,612,303 | Butler | Sept. 30, 1952 |
| 2,760,700 | Lien | Aug. 28, 1956 |